(12) United States Patent  
Takagi et al.

(10) Patent No.: US 6,956,586 B2  
(45) Date of Patent: Oct. 18, 2005

(54) IMAGE PROCESSING APPARATUS

(75) Inventors: Toshihiro Takagi, Osaka (JP); Tatsuo Miyagawa, Osaka (JP); Yasuhiro Inui, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 10/700,092

(22) Filed: Nov. 3, 2003

(65) Prior Publication Data

US 2004/0095358 A1  May 20, 2004

(30) Foreign Application Priority Data

Nov. 19, 2002 (JP) .......................... P2002-334571

(51) Int. Cl.[7] .............................. G09G 5/10; H04N 5/45
(52) U.S. Cl. ....................... 345/629; 345/589; 348/565
(58) Field of Search ............................. 345/589, 629, 345/632, 639, 640; 348/564, 565, 563, 569

(56) References Cited

U.S. PATENT DOCUMENTS

| | | | |
|---|---|---|---|
| 5,978,041 A * | 11/1999 | Masuda et al. | 348/563 |
| 6,236,392 B1 * | 5/2001 | Inamori | 345/629 |
| 6,297,797 B1 * | 10/2001 | Takeuchi et al. | 345/467 |
| 6,369,830 B1 * | 4/2002 | Brunner et al. | 345/629 |

FOREIGN PATENT DOCUMENTS

| | | | |
|---|---|---|---|
| JP | 08-211860 | 8/1996 | G09G 5/02 |
| JP | 2713677 | 10/1997 | G06T 1/00 |

OTHER PUBLICATIONS

Concise Statement of Relevancy Between The Invention and Materials (1 page).  
Patent Abstracts of Japan for Japanese Patent Publication No.: 08-211860 (2 pages).

* cited by examiner

Primary Examiner—Matthew Luu  
(74) Attorney, Agent, or Firm—Osha•Liang LLP

(57) ABSTRACT

An OSD image memory stores the OSD image of the reference color attribute. A color setting portion stores change set data for the brightness, transparency and saturation of the OSD image set by the user. An STB changes the color of the OSD image stored in the OSD image memory, based on the change set data for the brightness, transparency and saturation of the OSD image stored in the color setting portion, produces a composite video with the OSD image of changed color superposed on the video of a program, and outputs it from an output portion. Accordingly, the user can change the brightness, transparency and saturation of the OSD image according to one's preference.

8 Claims, 2 Drawing Sheets ically different color attribute (the attribute such as brightness, transparency and saturation). Also, when two images are displayed in superposition, the color of one image may obscure the characters contained in the other image. To solve the problem above, there have been offered a device having a function of preventing a distortion in the video near the boundary portion by adjusting the saturation near the boundary portion when two images are displayed in superposition (See Japanese Patent No. 2713677), and a device having a function of adjusting the color so that the character and the background image may not have the same color (See JP-A-8-211860).

However, in the conventional STB, since the OSD image is the menu screen for setting various parameters, the user could not adjust the color of the OSD image. Accordingly, the OSD is displayed with the preset color alone, resulting in a problem that the user could not display the OSD image with the color according to the user's own preference or change the color of the OSD image according to the video of the program on which the OSD image is superposed.

SUMMARY OF THE INVENTION

It is therefore an object of the invention to provide a receiving apparatus in which the color of the OSD image can be adjusted according to a user's own preference while the visibility of the OSD image with the adjusted color is kept.

In order to achieve the object, according to a first aspect of the invention, there is provided an image processing apparatus including: an image input unit configured to be input a first image; a color setting unit configured to set an adjustment value of a color attribute of a second image from a reference color attribute; a color adjustment excluded area setting unit configured to set an excluded area in which a color adjustment for the second image is excluded; a composite image producing unit configured to adjust the color attribute of the second image in accordance with the adjustment value except for the excluded area, and to produce a composite image by superposing the adjusted second image onto the first image; and an image output unit configured to selectively output the first image and the composite image, wherein the composite image producing unit adjusts brightness and transparency of the second image within a range between a predetermined range, and wherein the composite image producing unit adjusts, in a case where a difference in contrast between character included in the second image and an area of the first image where the character is to be superposed is less than a predetermined level, the color attribute of the character so that the contrast of the character reaches the predetermined level.

According to a second aspect of the invention, there is provided an image processing apparatus including: an image input unit configured to be input a first image; a color setting unit configured to set an adjustment value of a color attribute of a second image from a reference color attribute; a composite image producing unit configured to adjust the color attribute of the second image in accordance with the adjustment value, and to produce a composite image by superposing the second image onto the first image; and an image output unit configured to selectively output the first image and the composite image.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Hereinbelow, preferred embodiments of the present invention will be described in connection with an STB (set top box).

Figure 1:
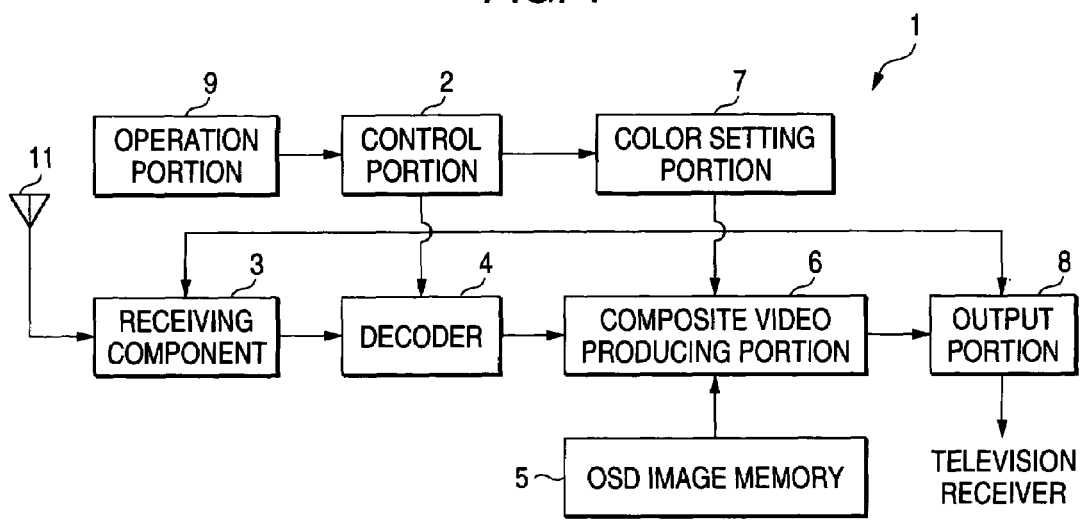
FIG. 1 is a block diagram showing a functional configuration of an STB according to an embodiment of the present invention.

FIG. 1 is a block diagram showing a functional configuration of an STB according to an embodiment of the present invention. The STB 1 according to the embodiment receives a digital broadcast program. The STB 1 includes a control portion 2 for controlling the operation of the STB 1, a receiving portion 3 for extracting a video signal and an audio signal of a program broadcast on a selected channel from a television broadcast signal received at an antenna 11, a decoder 4 for decoding the video signal and the audio signal extracted by the receiving portion 3, an OSD image memory 5 storing an OSD image (On-Screen Display image), a composite video producing portion 6 for producing a composite video having the OSD image superposed on the video of the program based on the video signal decoded by the decoder 4, a color setting portion 7 for setting the color of the OSD image to be superposed on the video of the program in the composite video producing portion 6, an output portion 8 for outputting the program video or the composite video, and an operation portion 9 for enabling the input operation.

In the embodiment, the OSD image corresponds to a second image; the video decoded and output by the decoder 4 corresponds to a first image; and the composite video produced by the composite video producing portion 6 corresponds to a composite image.

In the embodiment, the OSD image is an image including information to configure operation settings. The OSD image may also be an image including information indicating operation status.

The decoder 4 decodes the video data and the audio data encoded by an MPEG (MPEG2) method, for example. The composite video producing portion 6 switches the operation, in accordance with an instruction from the control portion 2, between the case of directly outputting the video of program and the case of producing the composite video with the OSD image superposed on the video of program. The OSD image memory 5 stores the OSD image data. This OSD image data indicates the reference color attribute (the attribute such as brightness, transparency and saturation) of each pixel. The color setting portion 7 stores an adjustment value of the OSD image to the reference color attribute for each of the brightness, transparency and saturation. The adjustment value of the OSD image to the reference color attribute that is stored in the color setting portion 7 is changeable by a predetermined input operation on the operation portion 9. The operation portion 9 has a receiving function of receiving a control code sent from not only a plurality of buttons for input operation but also a remote controller, not shown. The output portion 8 is connected to the television receiver, which allows the user to watch the video based on the video signal and hear the audio based on the audio signal, the video and audio signals being output from the output portion 8.

The operation of the STB 1 in the embodiment will be described hereinbelow. Firstly, the operation with an instance of outputting the video of the program received by the receiving portion 3 will be simply described.

The STB 1 extracts a video signal and an audio signal of the program broadcast on a currently selected channel from a television broadcast signal received at the antenna 11. The video signal and audio signal extracted here are encoded by the MPEG method. The decoder 4 decodes the video signal and audio signal of the program extracted by the receiving portion 3. The video signal and audio signal decoded by the decoder 4 is passed through the composite video producing portion 6 and converted into the analog video signal and audio signal in the output portion 8.

The output portion 8 is connected to the television receiver, and the television receiver displays the video based on the video signal output from the output portion 8 and outputs the audio based on the audio signal. Accordingly, the user can watch and hear the digital broadcast program on a selected channel in the STB 1 for the television receiver connected to the output portion 8.

Hereinbelow, a process for producing and outputting a composite video with the OSD image being stored in the OSD image memory 5 that is superposed on the video of the program on selected channel will be now described. The OSD image may be a setting guide image for various parameters to control the operation of the STB 1, or the image displaying the currently selected channel or the current time, for example. The OSD image memory 5 stores the reference color attribute (brightness, transparency and saturation) for each pixel of the OSD image.

The STB 1 according to the embodiment allows the individual adjustments of brightness, transparency and saturation of the OSD image at eleven stages. More specifically, the color setting portion 7 stores a brightness adjusting parameter r1, a transparency adjusting parameter r2, and the saturation (red, green and blue) adjusting parameters r3 to r5. For r1 to r5, an integer from "0" to "10" is set individually. Based on the set values r1 to r5, the brightness, transparency and saturation of the OSD image after change are decided in accordance with the following expressions.

Brightness after change= Reference brightness*(r1+5)/10

Transparency after change= Reference transparency*(r2+5)/10

Saturation after change (red)= Reference saturation*(r3+5)/10

Saturation after change (green)= Reference saturation*(r4+5)/10

Saturation after change (blue)= Reference saturation*(r5+5)/10

Accordingly, each of the brightness, transparency and saturation of the OSD image is adjustable in a range from 0.5 to 1.5 times in a unit of 0.1 times.

As is apparent from the above expressions, the OSD image has the reference color attribute when all of r1 to r5 are set to 5.

Herein, the settings of r1 to r5 stored in the color setting portion 7 will be described hereinbelow.

By performing a predetermined input operation in the operation portion 9, a setting change screen for r1 to r5 is output from the output portion 8 and displayed on the television receiver connected. The user sets each of r1 to r5, while seeing this setting change screen. For example, the user selects a parameter (any one of r1 to r5) for changing the setting, the value of the selected parameter is increased or decreased by one in accordance with an up/down key operation, and the decided value is stored as a selected parameter value in the color setting portion 7.

The setting change operation for r1 to r5 is also capable by the remote controller through a predetermined input operation.

In the above explanation, the value of the selected parameter (any one of r1 to r5) is increased or decreased by one through the up/down key operation. However, the value of the selected parameter (any one of r1 to r5) may be changed according to a positional change of a tab by displaying the tab.

Figure 2:
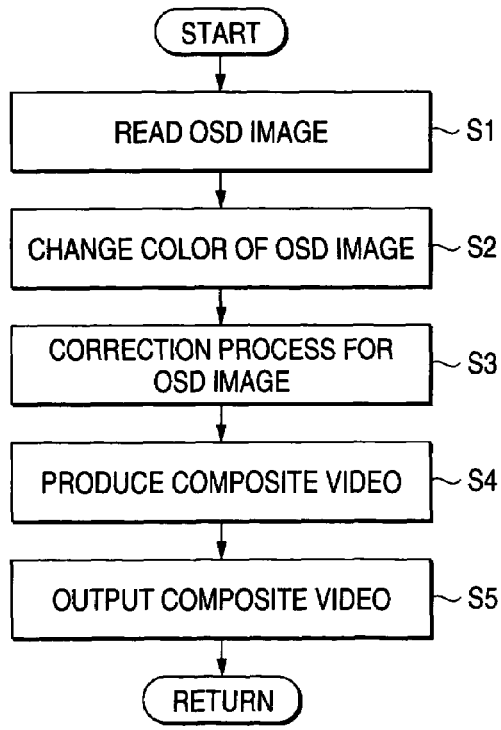
FIG. 2 is a flowchart showing the operation of the STB according to the embodiment.

A process for producing and outputting the composite video with the OSD image superposed will be described hereinbelow. FIG. 2 is a flowchart showing the process for producing and outputting the composite video with the OSD image superposed. The STB 1 reads the OSD image superposed on the video received by the receiving component 3 from the OSD image memory 5 (step S1). The STB 1 calculates the brightness, transparency and saturation (red, green, blue) after change for each pixel of the OSD image read at step S1, using the parameters r1 to r5 set in the color setting portion 7 and produce the OSD image of changed colors (step S2).

The OSD image memory 5 stores the brightness, transparency and saturation (red, green and blue) for each pixel in the OSD image stored in the above manner. At step S2, the brightness, transparency and saturation (red, green and blue) after change are calculated for each pixel.

The STB 1 determines whether or not each of the brightness, transparency and saturation (red, green and blue) for each pixel of the OSD image after change produced at step S1 is between the present upper and lower limit values. A correction process is performed for setting the brightness, transparency or saturation greater than the upper limit value to the upper limit value, or setting the brightness, transparency or saturation less than the lower limit value to the lower limit value (step S3). By performing the correction process at step S3, the brightness or transparency is prevented from being too high or low, and the entire image is prevented from being reddish.

The STB 1 produces the composite video with the OSD image corrected at step S3 superposed on the video of the program received by the receiving portion 3 in the composite video producing portion 6 (step S4). The STB 1 outputs the composite video produced at step S4 from the output portion 8 (step S5).

Figure 3:
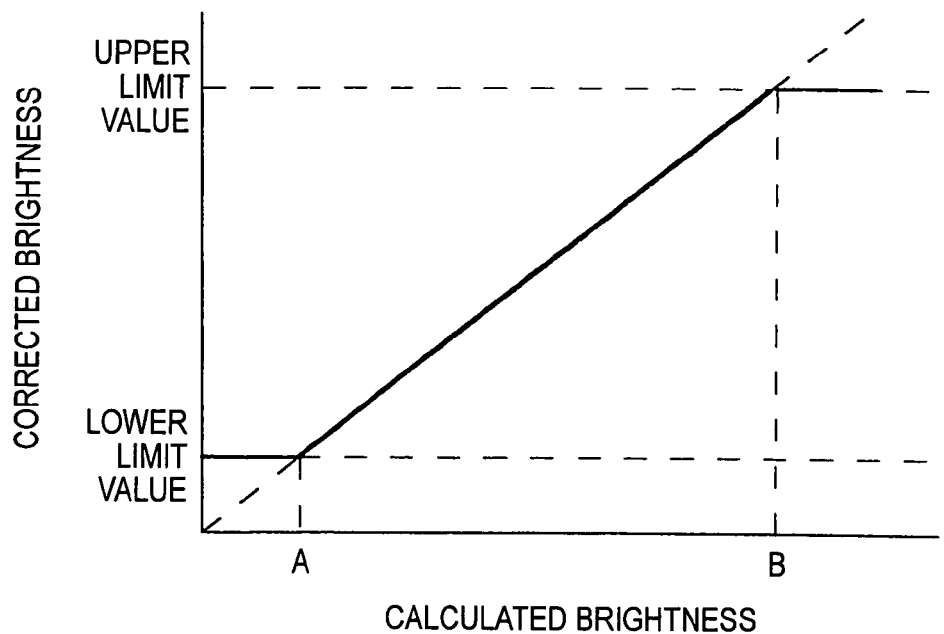
FIG. 3 is a graph showing a changeable range of brightness, transparency and saturation of OSD in the STB according to the embodiment.

Herein, the correction process at step S3 will be described below. Though the brightness is employed here as an example, the transparency and saturation (red, green and blue) are also corrected in the same manner. As shown in FIG. 3, if the pixel has the brightness out of a range between the preset upper and lower limit values, the brightness of the pixel greater than the upper limit value is corrected to the upper limit value and the brightness of the pixel less than the lower limit value is corrected to the lower limit value.

In FIG. 3, the brightness calculated at step S2 is taken along the axis of abscissas and the brightness corrected at step S3 is taken along the axis of ordinates. In FIG. 3, the reference symbol A denotes the lower limit value and the reference symbol B denotes the upper limit value.

Figure 4:
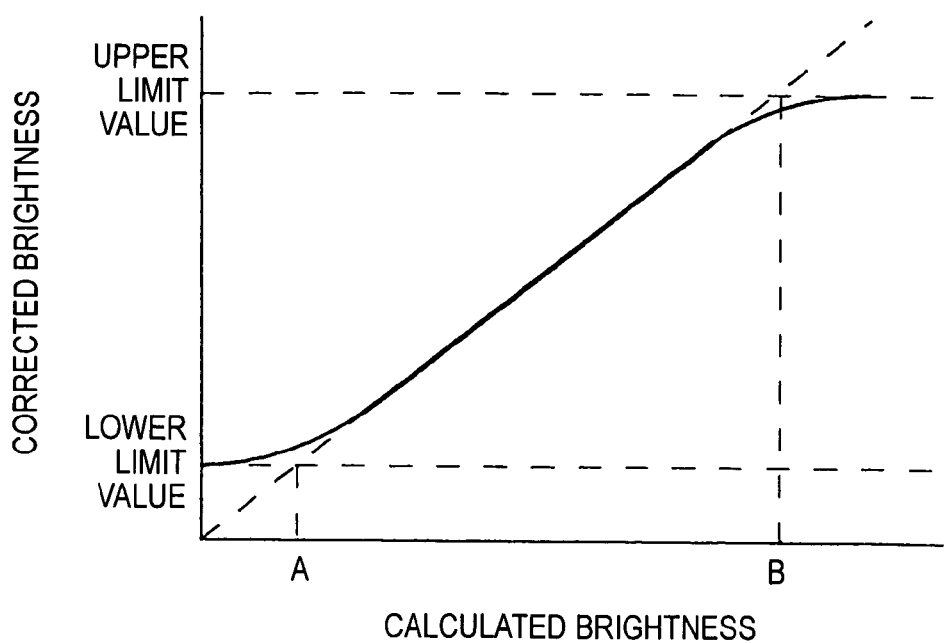
FIG. 4 is a graph showing a changeable range of brightness, transparency and saturation of OSD in the STB according to another embodiment of the present invention.

Also, for the pixel with the brightness greater than the upper limit value, the brightness may be corrected non-linearly, as shown in FIG. 4.

In the above, the description has made of the correction process at step S3 by only employing the brightness of the OSD image. However, the transparency and saturation (red, green, blue) are similarly corrected through the correction process.

As described above, the STB 1 according to the embodiment individually sets the brightness, transparency and saturation (red, green, blue) for the OSD image superposed on the video of the program received by the receiving portion 3, whereby the user can output the composite video superposed with the OSD image having the color adjusted to the users own preference.

Also, by performing the correction process at step S3, the brightness or transparency is prevented from being too large or small, and the entire image is prevented from being reddish. Therefore, it is possible to prevent the entire OSD image from having too large transparency to produce the composite video where the OSD image is not displayed, or from being extremely reddish or bluish in the saturation to make the composite video obscure.

In the above embodiment, the brightness, transparency and saturation (red, green and blue) are changeable for the entire OSD image. However, the change of the brightness, transparency and saturation (red, green and blue) may be limited to a partial area of the OSD image. As a result, even if the user changes the brightness, transparency and saturation (red, green and blue) of the OSG image, a producer or a designer's intention of the OSD image is securely conveyed to the user.

As the method for limiting the area for changing the brightness, transparency and saturation (red, green and blue), the area may be limited by the color of pixel (e.g., the change of brightness, transparency and saturation (red, green and blue) is inhibited for black pixel), or the area may be limited to the inside of the OSD image. For the pixel for which the change of color is limited, a change process for the color at step S2 is inhibited. At step S2, the change process for the color is performed only for the pixel for which changing the color is not limited.

Moreover, for the OSD image in which characters are displayed, the color of character may be automatically changed in accordance with the color of the background, or the character may be margined to increase the contrast near a boundary portion between the character and the background. In this manner, the character in the OSD image is displayed so that the user is easy to see.

For example, the average brightness is calculated for the video in the background (video of the program received by the receiving component 3), the calculated brightness is corrected such that:

1) in a case where the calculated brightness is above a predetermined level, the brightness of the character is adjusted to a lower level;

2) in a case where the calculated brightness is below the predetermined level, the brightness of the character is adjusted to a higher level; and 3) in a case where the calculated brightness is within a range of the predetermined level, the character is changed to have margined or shadowed attribute.

The present invention is also applicable to the receiving apparatus contained in the television receiver.

As described above, according to the present invention, the user can change the color of the OSD image according to the user's own preference. Also, the correction process is performed for the changed color of the OSD image, whereby the OSD image is prevented from being extremely reddish or bluish and obscured.

According to the invention, the color setting unit sets the color attribute of the OSD image from the reference color attribute, the composite video producing unit produces the composite video with the OSD image superposed on the video of the program received by the receiving unit, the color of the OSD image being adjusted based on the set contents of the color setting unit, and the video output unit outputs this composite video.

Accordingly, the user only needs to set the color attribute of the OSD image from the reference color attribute in the color setting unit to display and view the composite video with the OSD image of the color according to the user's own preference superposed on the video of the program received by the receiving unit.

Also, the color of the OSD image is adjusted in terms of brightness, transparency and saturation individually and continuously, whereby the user can easily adjust the color according to the user's own preference.

According to the invention, since the color of the OSD image is adjusted so that each of the brightness and transparency of the OSD image lies within a range between the preset upper and lower limit values, the OSD image is prevented from being not displayed at all (obscured) because the transparency is too large, or from being extremely too dark or light to cause a difference in the brightness from the video of the program received by the receiving unit (a distortion in the composite video).

According to the invention, the color adjustment limiting unit sets an area for inhibiting the adjustment of the color based on the set contents of the color setting unit, whereby the user is restricted to make the adjustment of the color for a portion for refraining the user to change the color, for example, the character in the OSD image.

As the method for setting the area for inhibiting the adjustment of the color, the area in the OSD image may be set, or the color of the OSD image to inhibiting the adjustment of the color may be set. For example, the adjustment for black may be inhibited.

According to the invention, since the difference in contrast between character and background is less than the predetermined level, the OSD image is displayed for the user to easily see the character.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An image processing apparatus comprising:
an image input unit configured to be input a first image;
a color setting unit configured to set an adjustment value of a color attribute of a second image from a reference color attribute;
a color adjustment excluded area setting unit configured to set an excluded area in which a color adjustment for the second image is excluded;
a composite image producing unit configured to adjust the color attribute of the second image in accordance with the adjustment value except for the excluded area, and to produce a composite image by superposing the adjusted second image onto the first image; and
an image output unit configured to selectively output the first image and the composite image,
wherein the composite image producing unit adjusts brightness and transparency of the second image within a range between a predetermined range, and
wherein the composite image producing unit adjusts, in a case where a difference in contrast between character included in the second image and an area of the first image where the character is to be superposed is less than a predetermined level, the color attribute of the character so that the contrast of the character reaches the predetermined level.

2. An image processing apparatus comprising:
an image input unit configured to be input a first image;
a color setting unit configured to set an adjustment value of a color attribute of a second image from a reference color attribute;
a composite image producing unit configured to adjust the color attribute of the second image in accordance with the adjustment value, and to produce a composite image by superposing the second image onto the first image; and
an image output unit configured to selectively output the first image and the composite image,
wherein the composite image producing unit adjusts, in a case where a difference in contrast between character included in the second image and an area of the first image where the character is to be superposed is less than a predetermined level, the color attribute of the character so that the contrast of the character reaches the predetermined level.

3. The image processing apparatus as claimed in claim 2, wherein the composite image producing unit adjusts brightness and transparency of the second image within a range between a predetermined range.

4. The image processing apparatus as claimed in claim 2 further comprising a color adjustment excluded area setting unit configured to set an excluded area in which a color adjustment for the second image is excluded, wherein the composite image producing unit adjusts the color attribute of the second image except for the excluded area.

5. The image processing apparatus as claimed in claim 2 further comprising a receiving unit configured to receive a program in which broadcasted in a selected channel, and to output a video image of the program to the input unit as the first image.

6. The image processing apparatus as claimed in claim 2 further comprising an image producing unit configured to produce the second image.

7. The image processing apparatus as claimed in claim 2, wherein the second image comprises information to configure operation settings.

8. The image processing apparatus as claimed in claim 2, wherein the second image comprises information indicating operation status.

* * * * *